United States Patent [19]

Hirahara

[11] Patent Number: 5,364,034
[45] Date of Patent: Nov. 15, 1994

[54] CONTROLLED LOW VOLUME IRRIGATION SYSTEM

[76] Inventor: Katsuji Hirahara, 771 Pomeryo Ave., Santa Clara, Calif. 95051

[21] Appl. No.: 197,859

[22] Filed: Feb. 17, 1994

[51] Int. Cl.$^5$ .............................. F04F 10/02; B05B 1/14
[52] U.S. Cl. .................................... 239/565; 239/302; 137/135; 137/140; 222/416
[58] Field of Search ............. 239/63, 65, 67, 302, 239/566, 565; 137/135, 140; 222/204, 416

[56] References Cited

U.S. PATENT DOCUMENTS

| | | | |
|---|---|---|---|
| 831,059 | 9/1906 | Greth | 137/135 |
| 1,027,622 | 5/1912 | McDonough | 137/135 |
| 3,783,888 | 1/1974 | Johnson | 137/140 |
| 4,846,206 | 7/1989 | Peterson | 137/1 |
| 4,938,420 | 7/1990 | Ruttenberg | 222/416 |
| 5,094,366 | 3/1992 | Lin | 222/416 |
| 5,195,657 | 3/1993 | Wells | 222/204 |
| 5,241,978 | 9/1993 | Shaw et al. | 239/65 |
| 5,267,695 | 12/1993 | Thayer | 239/566 |

FOREIGN PATENT DOCUMENTS

| | | | |
|---|---|---|---|
| 1523123 | 11/1989 | U.S.S.R. | 239/67 |
| 1715257 | 2/1992 | U.S.S.R. | 239/63 |
| 1743486 | 6/1992 | U.S.S.R. | 239/63 |

*Primary Examiner*—Andres Kashnikow
*Assistant Examiner*—Christopher G. Trainor
*Attorney, Agent, or Firm*—James J. Leary

[57] ABSTRACT

The low flow irrigation system can be used for batch or continuous time-dependent watering. It takes the form of a reservoir tank with a screen basket which filters out large particles from the water coming into the system. A float valve shuts off and turns on the intake water to preserve a predetermined level of water. Once the tank is filled initially, a siphon is started to begin flow into the standpipe, then into the distributor header. From there water flows through holes into plant water tubes and out to the plant clusters. All of the openings in the system allow for finely suspended matter to flow through so that waste water may be used. This system allows for easy adjustment of flow rates, while solving the water loss problems by limiting the area wet and eliminating the spray. The results are low water and energy usage, along with efficient plant nutrient application with minimal ground water pollution.

14 Claims, 7 Drawing Sheets

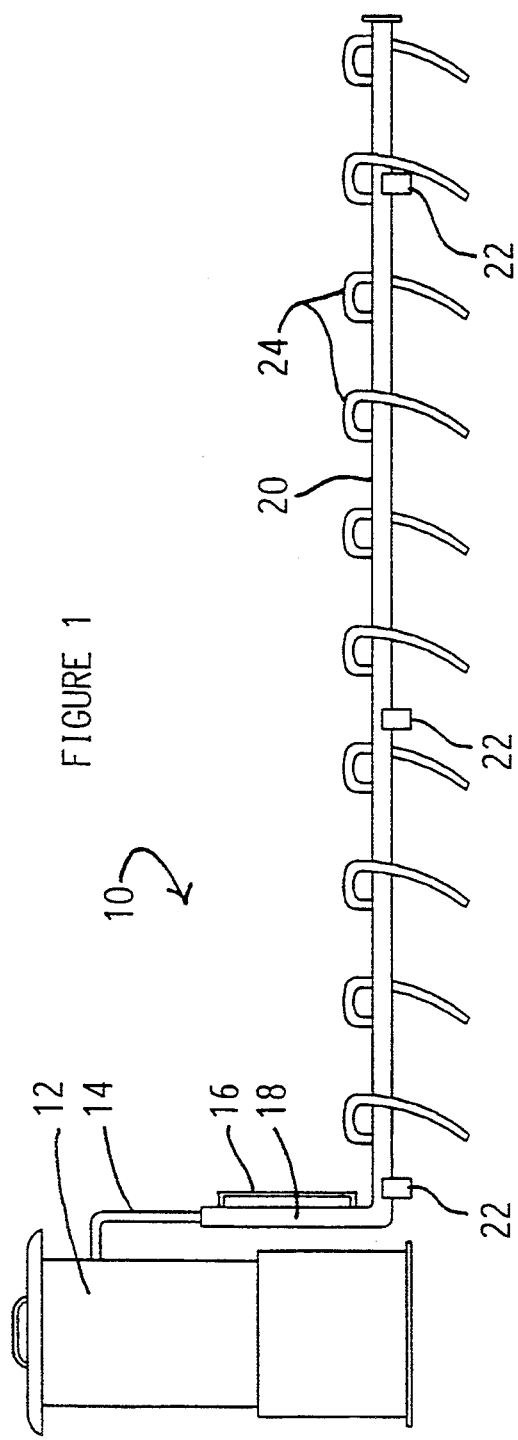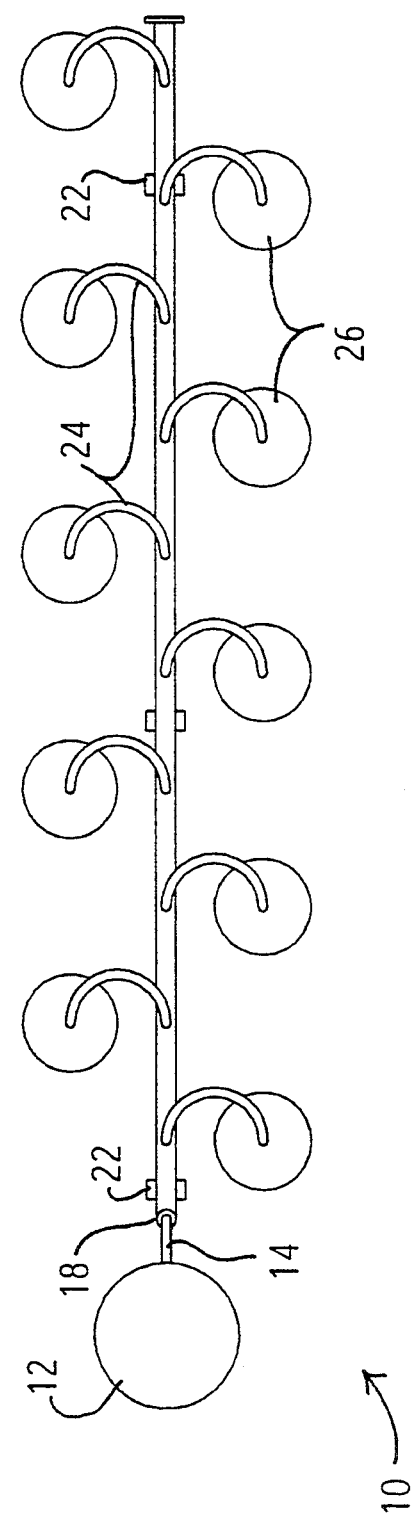

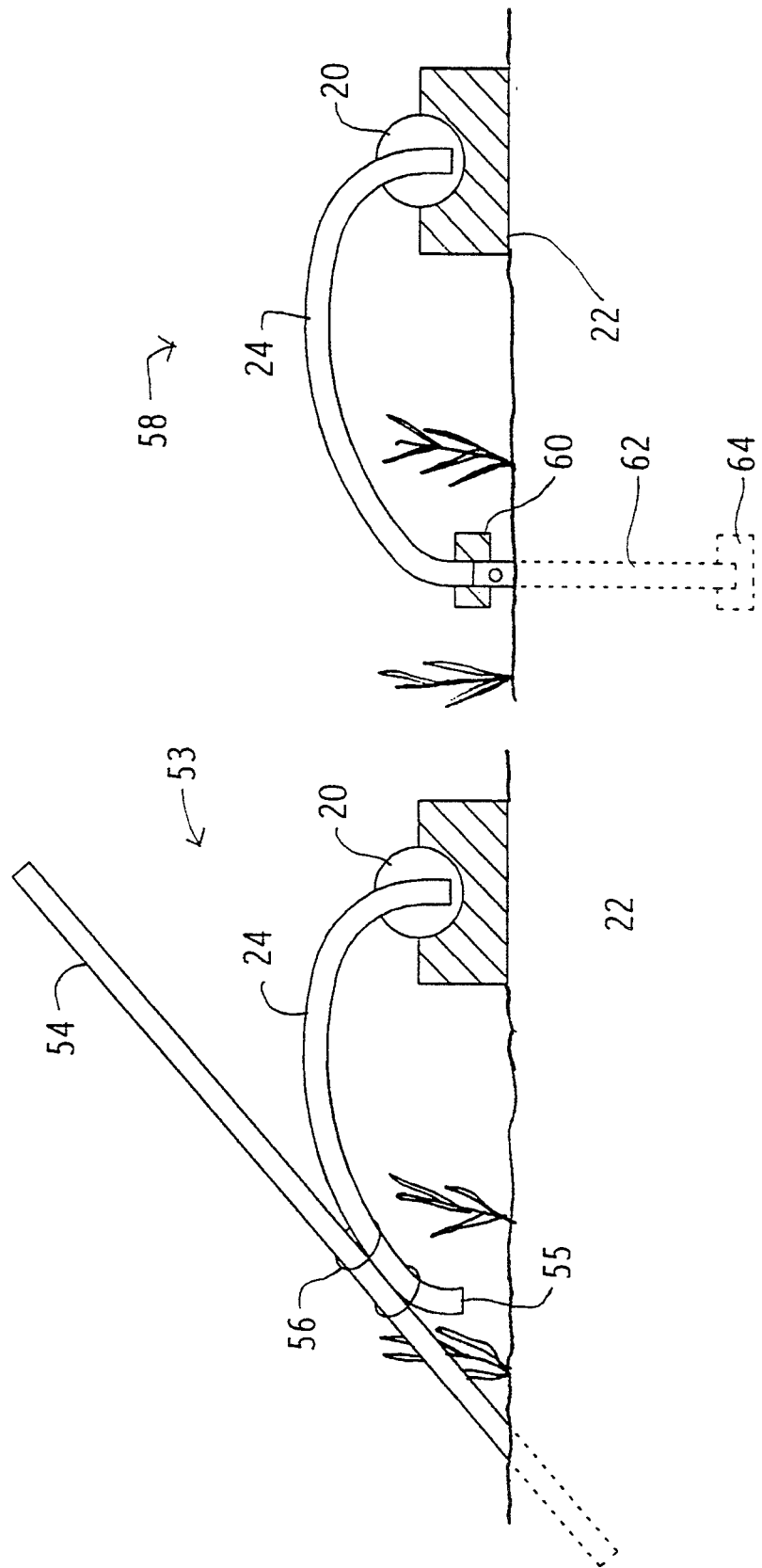

CONTROLLED LOW VOLUME IRRIGATION SYSTEM

FIELD OF INVENTION

This invention relates to agricultural irrigation systems. More specifically, it relates to an irrigation system for low volume drip irrigation.

BACKGROUND OF THE INVENTION

In current drip irrigation systems, small orifices or a small tortuous water path is utilized to control the water flow rate. Moderate water supply pressures with a pressure regulator and a very fine filtration screen are required. The fine screen filters and the flow limiting orifices or tortuous water paths can easily become clogged, hence the water delivery rate cannot be reliably and precisely controlled.

SUMMARY OF THE INVENTION

In order to overcome the problems with the prior art irrigation systems, several objects and advantages of the present invention are:

(a) Flow rates can be easily adjusted.

(b) Handles waste water with finely suspended matter or clean filtered water.

(c) Solves the water loss problem encountered in flood or spray irrigation systems.

(d) A measured total volume of water is metered simply and uniformly to many plant clusters.

(e) Allows for underground watering.

(f) Can be used for batch or continuous time-dependent watering.

(g) No manual control valve is necessary.

(h) Can efficiently and uniformly irrigate a long row of vegetation.

(i) Flow to each plant cluster can be as low as 0.2 gallons per minute thereby penetrating only the soil surrounding the plants.

(j) The system is easily expanded or contracted

In keeping with these objectives the low flow irrigation system takes the form of a reservoir tank with a screen basket which filters out large particles from the water coming into the system. A float valve shuts off and turns on the intake water to preserve a predetermined level of water. Once the tank is filled initially, a siphon is started to begin flow into the standpipe, then into the distributor header. From there water flows through holes into plant water tubes and out to the plant clusters. Other objects and advantages of the invention will no doubt occur to those skilled in the art upon reading and understanding the following detailed description along with the accompanying drawings.

BRIEF DESCRIPTION OF THE DRAWINGS

FIG. 1 shows side view of a small low flow irrigation system.

FIG. 2 shows top view of a small low flow irrigation system.

FIG. 8 shows a detail of the above ground final watering element of the low flow irrigation system.

FIG. 9 shows a detail of the underground final watering element of the low flow irrigation system.

DETAILED DESCRIPTION OF THE INVENTION

Figure 3:
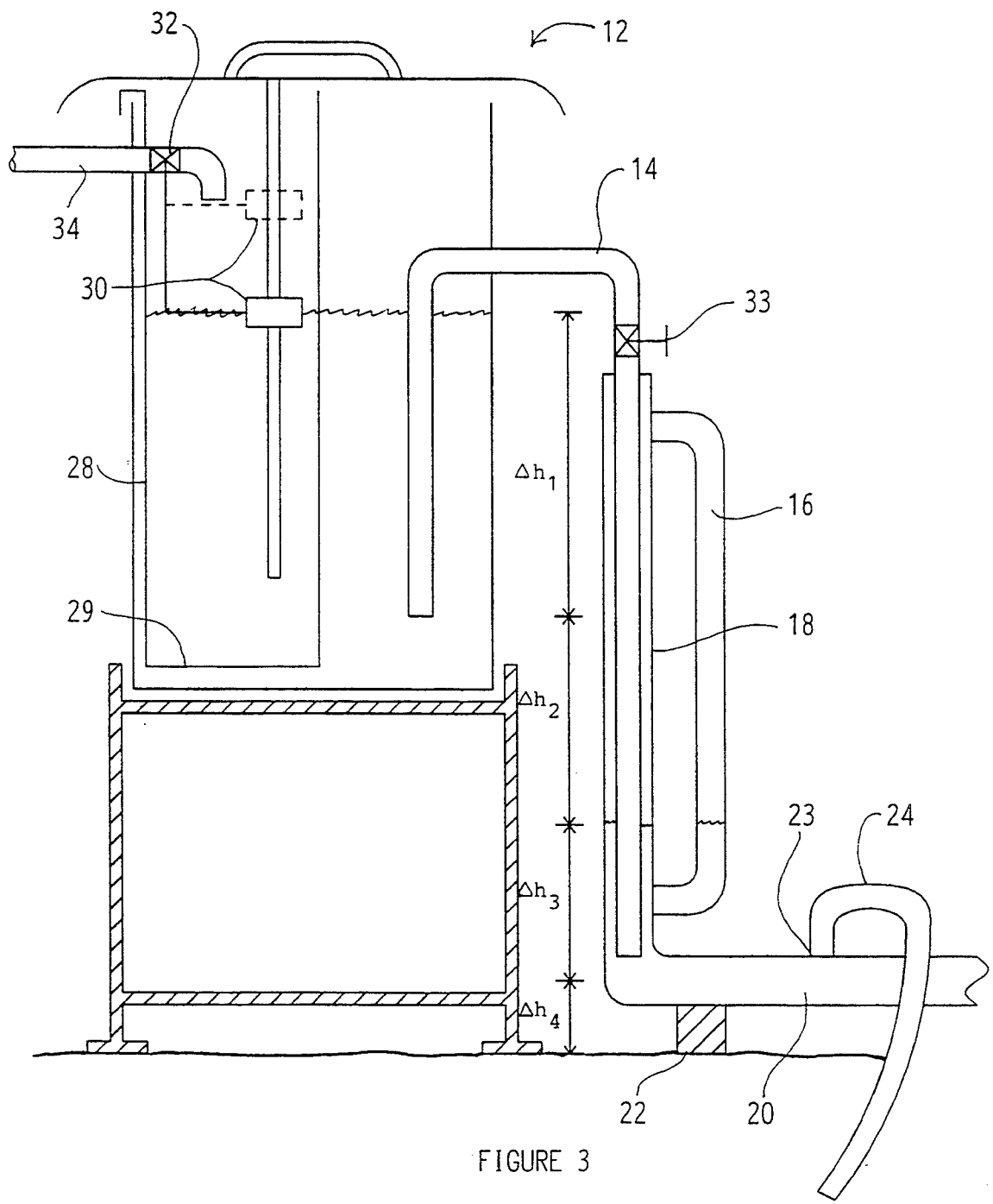
FIG. 3 shows the preferred embodiment of the reservoir tank of the low flow irrigation system.

FIGS. 1 and 2 show side and top views of the low flow irrigation system. The low flow irrigation system 10 begins with the input of water into the reservoir tank 12. Once the tank 12 is filled, water begins to flow through the siphon or U-tube 14 into the standpipe 18 then into the distributor header 20. The distributor header 20 is supported by blocks 22 placed at intervals along the length. From there water flows through holes 23 into plant water tubes 24 and out to the plant clusters 26. Since the system has low head pressure, the distributor header 20, standpipe 18, and plant water tubes 24 can be pressure fit.

This irrigation system 10 solves the water loss problem encountered in flood or spray irrigation systems by confining flow to the plants' vicinity. By utilizing low hydraulic pressures and large orifices, energy and evaporation losses are minimized, while a measured total volume of water is metered simply and uniformly to many plant clusters 26 at a sufficiently slow rate to penetrate only the soil surrounding the plants. This is easily achieved because in an irrigation system utilizing a fixed length of tubing with a relatively large opening (0.175 inch diameter), the flow rates can be adjusted by making small changes in the difference of liquid level head. These savings of water are especially important in areas where there is a water supply shortage. Low hydraulic water pressure requirements also result in low irrigation energy cost.

This system 10 may be used as a batch watering system (FIG. 4) or a continuous time-dependent system (FIG. 3) to uniformly distribute water at a low hydraulic head for controlled slow water flow to each plant cluster 26.

FIG. 3 shows the preferred embodiment of the reservoir tank 12 of the low flow irrigation system 10. Used water is accumulated in a reservoir tank 12 whose size depends on the number of plants to be watered and the quantity of water to each plant in a single watering. Nutrients can be dissolved in the reservoir tank 12 during the filling cycle. Large particles are removed by a screen basket 28 in the tank 12. At near overflow level in the tank 12, a siphon 14 initiates water flow automatically into the vertical standpipe 18 that is connected to the horizontal distributor pipe 20. The distributor header 20 (tapered if required for uniform velocity) has top-located quarter inch diameter holes 23 along its length. As the pipe 20 fills with water, flow is initiated to the individual plant clusters 26. The flow slowly increases as the level in the standpipe 18 provides more hydraulic head, and the flow will eventually achieve the system's equilibrium.

There is an auxiliary water supply line 34 which allows for the maintenance of a constant level in the reservoir tank 12. A float 30 is used to open and close the shut off valve 32 for the auxiliary water supply line 34, and hence a constant flow from the tank 12 to the distributor header 20, once equilibrium level condition is reached in the standpipe 18. The float 30 is shown in solid lines as it would typically be during normal flow.

The float 30 is shown in dashed lines as it would be if it were being used to automatically start the siphon.

On the siphon tube 14 you may optionally add a valve 33 to shut off flow from the reservoir tank 12 without emptying the tank 12. This may be required for many reasons. For example, if something happens to the system 10 requiring immediate attention, the system 10 might have to be shut down to prevent spillage.

At any given instant, the total flow rate depends on the water level in the tank 12 and the level in the distributor standpipe 18 or siphon 14 discharge. The flow rate to each individual plant cluster 26 depends on the height difference between the water level in the distributor standpipe 18 and each tube 24 discharge opening.

A very effective and simple method of total water flow control is achieved with an appropriately sized, diameter and length, inverted U-flow tube 14 communicating from the reservoir tank 12 to the standpipe 18 with both ends of the tube 14 immersed in water. No manual control valve is necessary when the U-flow tube 14 is properly sized. Attached to the standpipe 18 is a clear plastic marked tube which can be used for a level gauge 16 indicating the flow rate.

A length of one quarter inch O.D. plastic tubing 24 with sufficiently large flow area to prevent plugging with fine solid particles is used to provide sufficient pressure drop for controlling uniform watering the length of the distributor pipe 20. Flow to each plant cluster 26 can be as low as 0.2 gallons per minute (in the range of drip irrigation systems). No flooding was experienced when plants were watered at this rate.

The total system water flow would depend on the siphon pipe 14 size and the water level in the reservoir tank 12. Since the siphon 14 extends into the vertical standpipe 18, the rise in level in the standpipe 18 reduces the siphon rate automatically due to increased back pressure. Water flows unrestricted through ¼ inch O.D. plastic tubing 24.

It also shows that the tank 12 can be elevated to increase the total flow. A ⅛ inch mesh screen can be made into a simple elongated screen basket 28 to remove particles larger than 0.12 inches and heavy sand particles, which settle to the solid bottom 29 of the basket 28 as water is introduced into the tank 12. Fine, hard-to-remove colloidal particles (normally filtered in drip irrigation system) pass through the large orifices used in this system 10. For household gardens, where about ten to twelve clusters 26 are watered at the same time, a tank 12 with a capacity of ten to fifty gallons should be adequate. A two inch diameter plastic pipe can be used for the distributor header 20 (sizing is important for uniform distribution).

Figure 4:
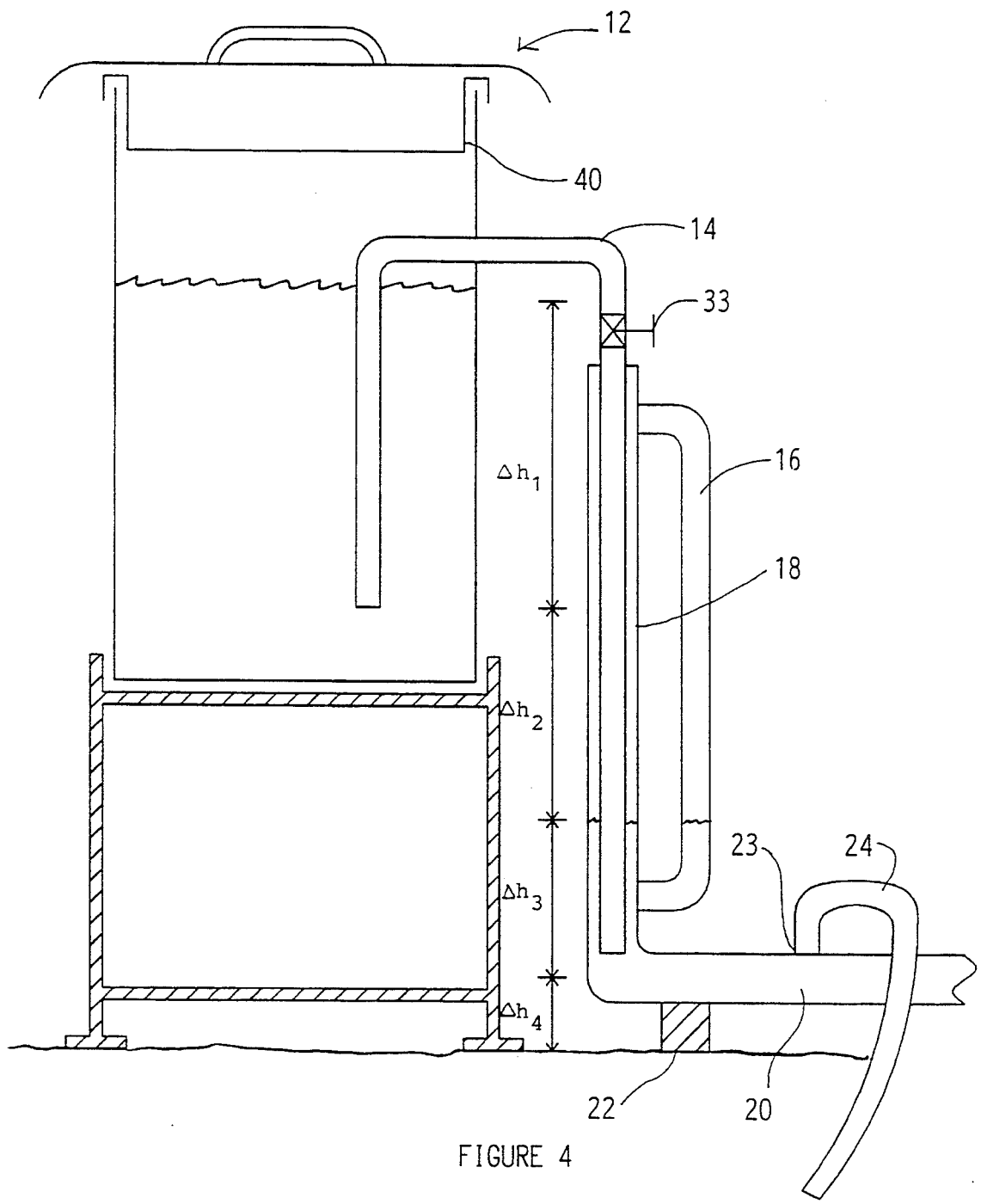
FIG. 4 shows a second embodiment of the reservoir tank of the low flow irrigation system.

FIG. 4 shows a second embodiment of the reservoir tank 12 of the low flow irrigation system 10. This embodiment is best for batch watering where a predetermined amount of water is distributed among a group of plant clusters 26. An elevated reservoir tank 12 with a self priming siphon 14 is used. This allows for the filling of the tank 12 to near its capacity and the addition of solid or liquid nutrients to the irrigation water. By the addition of a little more water, a siphon is initiated which flows into the distributor standpipe 18. Dense, undissolved solid particles remain in the reservoir tank 12, since the siphon pipe 14 entrance is a few inches from the bottom. The water accumulates in the horizontal distributor pipe 20, fills to a certain level, and siphons out through the ¼ inch tubing 24 to each plant cluster 26.

In this embodiment the flow rate would slowly decrease as the level in the tank 12 decreases, but the total quantity of water added to each plant cluster 26 would be constant with each watering.

Once again a shut off valve 33 may be added to the system to allow the user to shut down the system 10 without emptying the reservoir tank 12. This may be important because during planting there may be fewer clusters 26 than appropriate for the tank 12 size, therefore more water than required for watering may be placed in the tank 12 in order to start the siphon. The shut off would allow the user to shut the system off when enough water has been distributed.

This embodiment is an easy way to use recycled or household waste water because the water can be poured or siphoned into the reservoir tank 12, nutrients added if desired, then the system 10 would start with the addition of a little more water. The system 10 would then flow until empty. The waste water would flow unrestricted through ¼ inch O.D. plastic tubing 24. Hence, particles with diameters smaller than 0.175 inches are allowed to move through the system 10 with no hindrance. No problems were encountered when using wash water from rice, fruits and vegetables as well as water from the bathroom taps.

Figure 5:
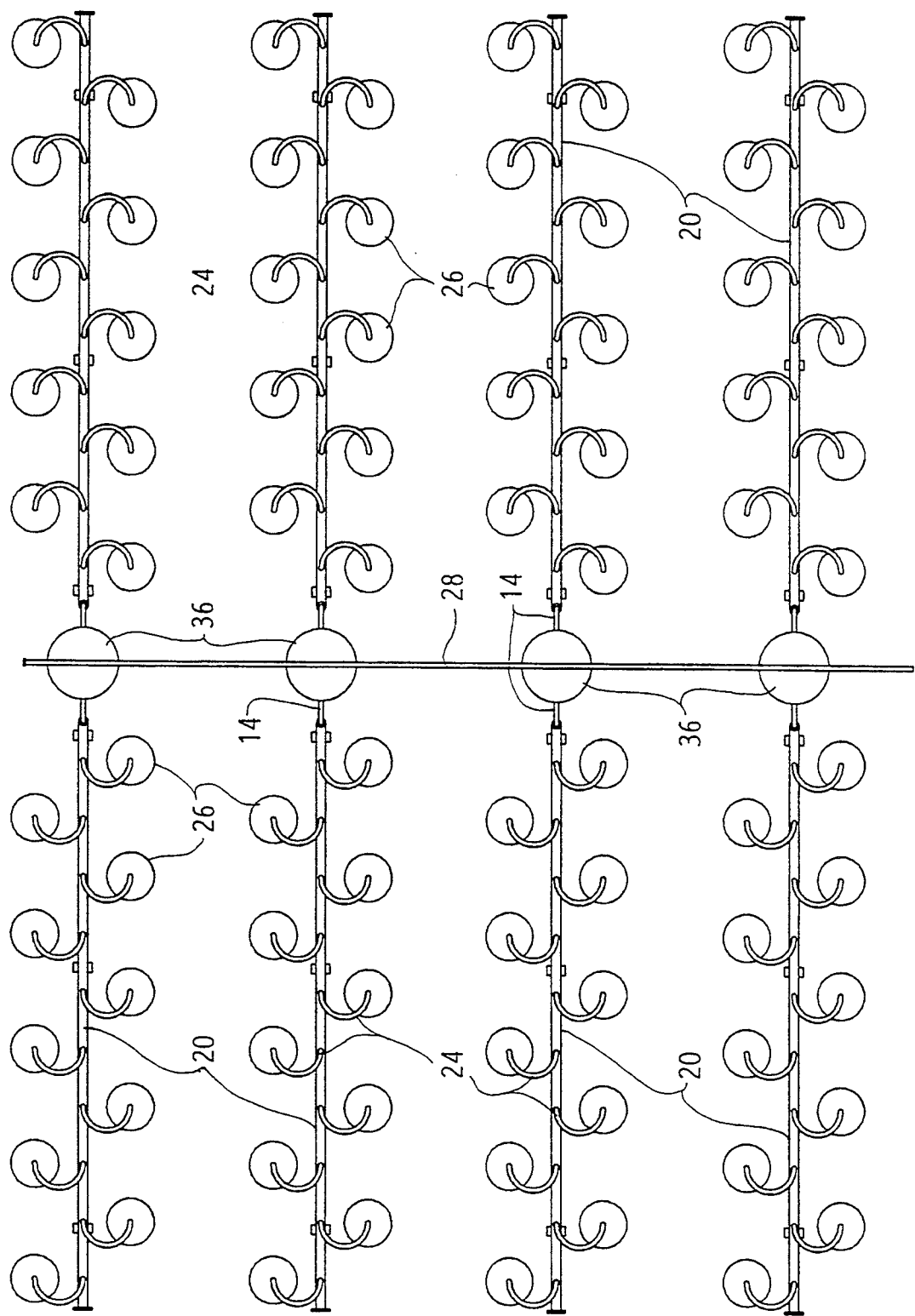
FIG. 5 shows a plan of a typical garden set up with the low flow irrigation system.

FIG. 5 shows a plan of typical garden set up with the low flow irrigation system 10. The same concept of a controlled low-volume irrigation rate as previously discussed can be expanded for commercial fruit or vegetable farming operations. For example, a one-hundred-gallon reservoir tank 36 can supply two twenty-five foot long water headers 20 in one row, thus supplying two rows of vegetables in a straight line. In a line perpendicular to the rows of irrigation pipes 20, one-hundred-gallon reservoir tanks 36 can be spaced at approximately eight feet apart. Water can thus be supplied by a single pipe header 28 placed in line with the reservoir tanks 36. Each tank 36 is serially filled such that in a relatively short time, the field is watered with a controlled volume of water to each plant cluster 26. By proper instrumentation, each tank 36 can be filled as many times as required.

This method uses several U-shaped flow tubes 14 from one level controlled reservoir tank 12 to expand the irrigation system 10. If a longer irrigation area is desired this can be achieved by increasing the distributor 20 size near the water inlet and raising the reservoir water level, this allows distributor 20 to be extended to cover a longer area.

Figure 6:
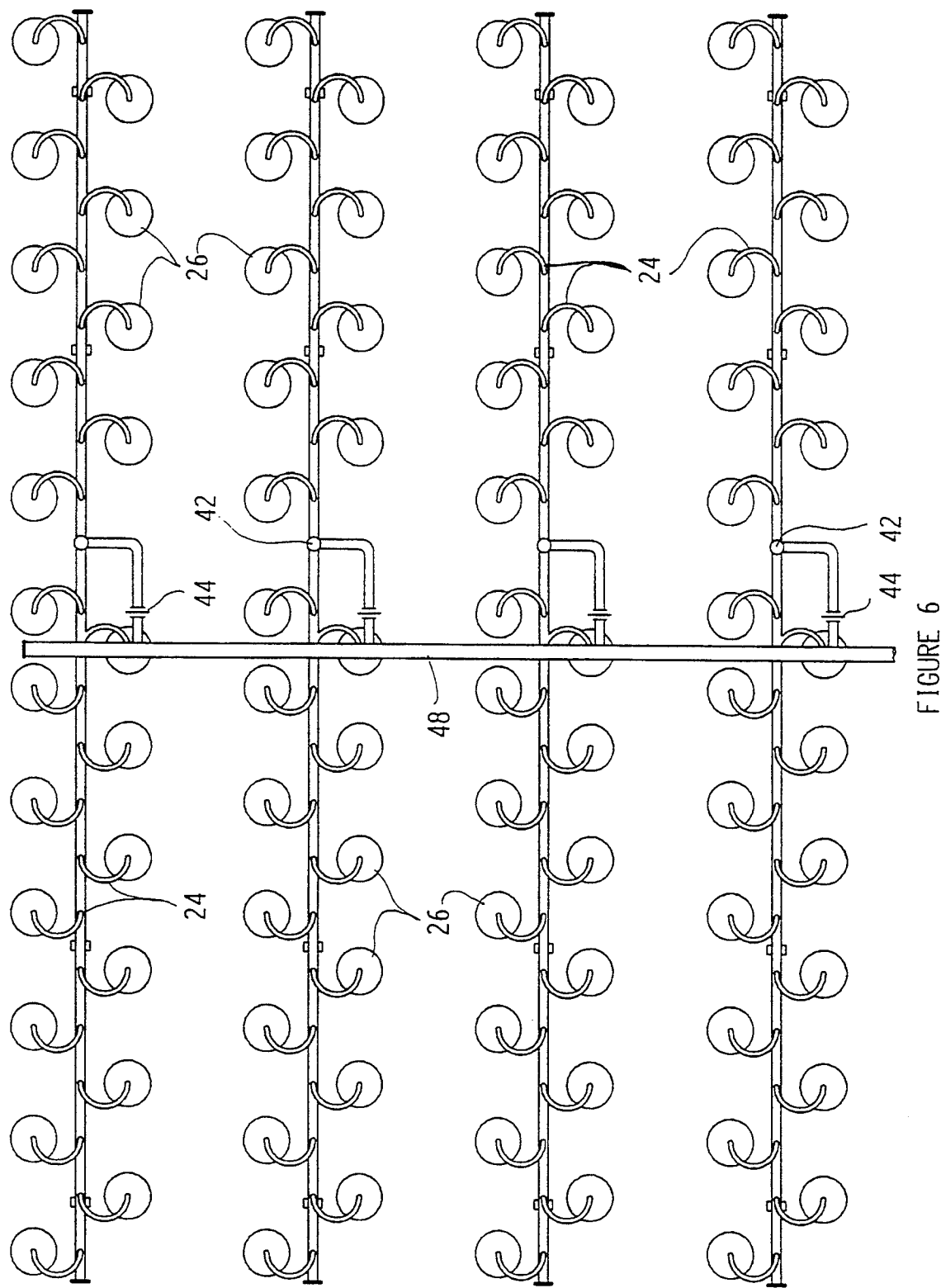
FIG. 6 shows a plan of a garden set up with a different embodiment of the low flow irrigation system.

FIG. 6 shows a plan of a garden set up with a different embodiment of the low flow irrigation system. This is an alternative to the system pictured in FIG. 5. A small reservoir container with a time-dependent water irrigation system can be used. The system would allow one patch of plants to be watered for a determined amount of time. A 4 to 5 inch diameter plastic pipe is used to control the water head pressure. It provides the option of maintaining higher water flows to each plant cluster by employing a longer riser for a higher head pressure. Adjustments can thus be easily made for various soil conditions, weather, and plant water requirements.

Figure 7:
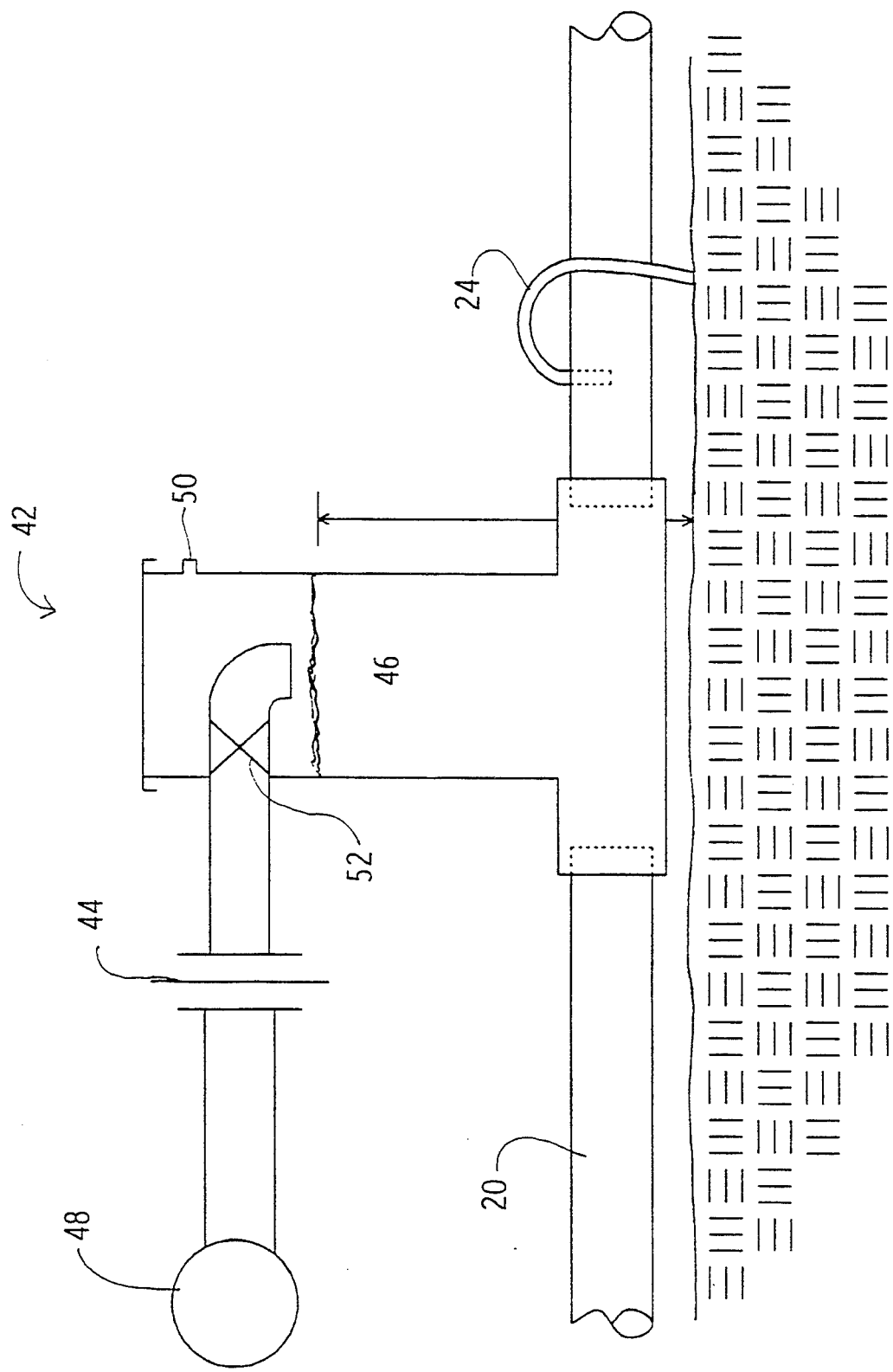
FIG. 7 shows a close-up of the flow control element of the set up of FIG. 6.

FIG. 7 shows a close-up of the flow control element of the set up of FIG. 6. Water flows in through the water supply line 48 to the restriction orifice 44. A pressure or level sensitive valve 52 controls the water flow into the hydraulic pressure control 42. The water then flows into the chamber 46. This chamber 46 performs an equivalent function to the standpipe. There is a vent 50 to allow the system 10 to fill without adding air pressure to the system. Water flows out the bottom portion of the chamber 46, which is T-shaped, into the distributor 20 and out the watering elements 24.

FIG. 8 shows a detail of the above ground final watering element 53 of the low flow irrigation system 10. For each plant cluster 26, a ¼ inch I.D. hole is drilled on the top side of the two inch distributor header 20. One end of a ¼ inch O.D. plastic tubing 24 is pressed into the drilled hole, and the opposite end is routed into the center of the plant cluster 26. The discharge tubing 24 can be tied near the end of a stake 54 and driven into the soil to maintain the position of the discharge opening 55.

FIG. 9 shows a detail of the underground final watering element 58 of the low flow irrigation system 10. This method allows for underground watering by metering water to each plant cluster 26 in buried vertical perforated tubing or pipes 62 near the plants. The underground tube 62 has a diameter of ½ or ¾ inch, with perforations of approximately 1/32 inch in diameter. The top of the underground tube 62 is connected 60 to the end of the plastic tube 24, and the bottom has a cap 64.

All the types of final watering elements are inserted through top holes 23 on the distributor header 20. This insures irrigation starts at the same time with the header 20 filled with water which creates the lowest header flow velocity. The tubes 24 are inserted to near the bottom of the header 20 which insures the header 20 is nearly empty when the system 10 shuts down. This is due to the automatically initiated siphon action which occurs when the height of the water in the header tube 20 becomes higher than the maximum height of the U-shaped tubes 24 and continues until the header 20 is essentially empty. The flow to individual plants can be adjusted by changing the length of the tubing 24 or the height of the discharge opening 55 relative to the header 20.

An example of a generic system would have each watering element watering one plant cluster 26 of approximately 18 to 24 inches in diameter with between 2 and 4 plants. The clusters 26 spaced about 3 feet on center and the plants trained for vertical growth using a 2.5 foot diameter wire fence cylinder 5 to 6 feet high. The wire fencing having 3 inches openings.

OPERATIONAL DESCRIPTION

Water level in the reservoir tank 12 is controlled automatically by addition of well, gray recycled or reclaimed water. An inverted flow U-tube 14 controls total water to the standpipe 18. By having both ends of the U-tube 14 always in water, small changes in the water level in the tank 12 result in minimal change in hydrostatic water level in the standpipe 18. For example, a small increase in water level in the tank 12 increases flow through the flow U-tube 14. Immediately the water level in the standpipe 18 increases slightly to decrease total flow (increased back pressure). This opposite compensation attempts to maintain a more constant water flow thus resulting in a more constant level in the standpipe 18.

As seen FIGS. 3 and 4, $\Delta h_1$ is the hydrostatic pressure from fluid in the reservoir tank 12. $\Delta h_2$ is the hydrostatic pressure from the vacuum created by the U-tube 14. Therefore $\Delta h_1 + \Delta h_2$ is the total driving force available to force flow through the U-tube 14. $\Delta h_3$ is the hydrostatic pressure from the fluid in the standpipe 18. A $\Delta h_4$ is the hydrostatic pressure from the siphon effect in the flexible tubing 24. Therefore $\Delta h_3 + \Delta h_4$ is the total driving force available to force flow through the flexible tubing 24. Water flow can be reduced by: (a) lowering the liquid level in the tank 12 or (b) lowering the tank 12. This would reduce total flow due to the reduction of the driving force $\Delta h_1 + \Delta h_2$. Reduction of $\Delta h_1$ and $\Delta h_2$ reduces $\Delta h_3$ which reduces the watering rate to each plant cluster 26. $\Delta h_4$ can also be controlled by raising the tube 24 discharge opening.

Based on commercial pipe sizing, a single distributor 20 with holes along its length will distribute water in a non-uniform pattern unless certain conditions are met. One condition requires the hole pressure drop be ten times the pipe distributor 20 pressure drop. The second condition is that the hole pressure drop is ten times the momentum energy of the fluid. Thus for a given water flow rate it becomes a choice of a smaller pipe distributor 20 with small holes and high water pressures vs considerably larger pipe size with larger holes and lower water pressures. By irrigating to the area of plant growth only, it has been found that practical pipe size can be used at lower water pressures and larger orifice holes which meets the conditions for uniform water distribution. A two inch diameter PVC pipe fifty feet long is adequate in watering at a rate of five gallons per minute with good flow distribution the length of the pipe. For a longer distributor which would result in higher inlet flow, pipe size in the first one third might be three inches, two and a half inches for the mid-one third followed by two inches the final one third with a total distributor 20 length of about one hundred feet. Appropriate numbers of one quarter inch I.D. holes are drilled on top of the distributor header 20. This would result in a pipe full of water (minimum velocity) before starting water to all the plants at the same time.

One quarter inch outside diameter tubes 24 about 18–24 inches in length are used to direct water flow from the water distributor. Due to the low working pressures (10 inches water) these tubes 24 can be press fitted into the holes 23 without leakage. The flow area is sufficiently large to pass through small colloidal particles normally very difficult to filter. The pressure drop through the tubes 24 is over ten times the velocity or momentum energy and pressure drop of the distributor header to ensure uniform flow distribution throughout its length. It should be pointed out that the flow driving force through the U-flow tube 14 and small plastic tubing 24 at normal flow conditions is mainly the result of hydrostatic water pressure.

Flow due to the siphon action occurs mainly at the end to empty the tank 12 and pipe 20. Some additional flow control to each plant cluster 26 can be adjusted by lowering or raising the discharge tube opening.

Although the examples given include many specificities, they are intended as illustrative of only some of the possible embodiments of the invention. Other embodiments and modifications will, no doubt, occur to those skilled in the art. Thus, the examples given should only be interpreted as illustrations of some of the preferred embodiments of the invention, and the full scope of the invention should be determined by the appended claims and their legal equivalents.

I claim:
1. An irrigation system comprising:
   a water storage reservoir,
   a siphon tube, said siphon tube being in the shape of an inverted U, said siphon tube having a first end and a second end, said siphon tube having a bend intermediate said first end and said second end, said siphon tube having an ascending portion extending from said first end to said bend and a descending portion extending from said bend to said second end, said first end of said siphon tube being in fluid connection with said water storage reservoir, said second end being lower in elevation than said first end, a header pipe, said header pipe comprising a substantially horizontal leg and a vertical leg, said vertical leg extending upward from said substantially horizontal leg, said vertical leg having an upper end, said second end of said siphon tube being nonsealingly positioned within said vertical leg of said header pipe, said upper end of said vertical leg being position around said descending portion of said siphon tube proximate said bend such that substantially all of said descending portion of said siphon tube is positioned within said vertical leg, said upper end of said vertical leg being open to the atmosphere, and a plurality of discharge tubes, each of said plurality of discharge tubes being in fluid communication with said horizontal leg of said header pipe.

2. The irrigation system of claim 1, wherein each of said plurality of discharge tubes has an inverted U shape, and wherein each of said plurality of discharge tubes comprises an inlet end and a discharge end, said inlet end of each discharge tube being in fluid communication with the interior of said header pipe, said discharge end of each discharge tube being in fluid communication with the exterior of said header pipe.

3. The irrigation system of claim 1, further comprising:

a water inlet in fluid communication with said water storage reservoir, a water level control valve means for regulating the flow of water from said water inlet into said water storage reservoir for maintaining the level of water in said water storage reservoir at a predetermined depth.

4. The irrigation system of claim 3 wherein said water level control valve means comprises a float valve which shuts off the flow of water from said water inlet into said water storage reservoir when the level of water in said water storage reservoir reaches said predetermined depth.

5. The irrigation system of claim 1, wherein said water storage reservoir has an upper rim and said bend of said siphon tube has an elevation which is lower than said upper rim, such that when said water storage reservoir is filled with water to a level above said bend of said siphon tube a siphon action is initiated in said siphon tube.

6. The irrigation system of claim 1 further comprising a flow control valve in said siphon tube for regulating the flow rate of water through said siphon tube.

7. The irrigation system of claim 1 further comprising a filter means within said water storage reservoir for filtering solid particles from the water in said water storage reservoir before said water enters said siphon tube.

8. An irrigation system comprising:

a water storage reservoir, said water storage reservoir having a bottom and an upper edge, said upper edge being a height $Y_1$ above said bottom, a water inlet in fluid communication with said water storage reservoir, a water level control valve means for regulating the flow of water from said water inlet into said water storage reservoir for controlling the level of water in said water storage reservoir at a height $Y_2$ which is lower than $Y_1$, a primary siphon tube, said primary siphon tube being in the shape of an inverted U, said primary siphon tube having an ascending leg which is in fluid communication with the interior of said water storage reservoir and a descending leg which is in fluid communication with the exterior of said water storage reservoir, said primary siphon tube having a bend between said ascending leg and said descending leg, said bend having a maximum height $Y_3$ which is below $Y_1$, a siphon starter means for filling said water storage reservoir with water to a level which is between $Y_3$ and $Y_1$, thereby initiating a siphon action in said primary siphon tube, a header tube, said header tube having a vertical leg and a substantially horizontal leg, said horizontal leg being at an elevation which is below the bottom of said water storage reservoir, said vertical leg extending upward from said horizontal leg to a height $Y_4$, said descending leg of said primary siphon tube being positioned within said vertical leg of said header tube, and at least one secondary siphon tube, said secondary siphon tube being in the shape of an inverted U, said secondary siphon tube having an ascending arm which is in fluid communication with the interior of said header tube and a descending arm which is in fluid communication with the exterior of said header tube, said secondary siphon tube having a bend between said ascending arm and said descending arm, said bend having a maximum height $Y_5$ which is less than $Y_4$, such that when said header tube is filled with water to a level higher than $Y_5$ a siphon action is initiated in said secondary siphon tube.

9. The irrigation system of claim 8 further comprising a multiplicity of secondary siphon tubes, each of said secondary siphon tubes being in the shape of an inverted U, each of said secondary siphon tubes having an ascending arm which is in fluid communication with the interior of said header tube and a descending arm which is in fluid communication with the exterior of said header tube, each of said secondary siphon tubes having a bend between said ascending arm and said descending arm, said bend having a maximum height $Y_5$ which is less than $Y_4$, such that when said header tube is filled with water to a level higher than $Y_5$ a siphon action is initiated in each of said secondary siphon tubes.

10. The irrigation system of claim 9 wherein said horizontal leg of said header tube has an upper wall having a multiplicity of holes through said upper wall and said ascending arm of each of said multiplicity of secondary siphon tubes is inserted through one of said multiplicity of holes forming a fluid tight seal between said hole and said ascending arm.

11. The irrigation system of claim 10 wherein said horizontal leg of said header tube has a lower wall and said ascending arm of each of said multiplicity of secondary siphon tubes has an inlet end, said ascending arm being inserted such that said inlet end is proximate said lower wall of said horizontal leg, and said descending arm of each of said multiplicity of secondary siphon tubes has a discharge end, said discharge end being at a lower elevation than said inlet end, such that the siphon action initiated in said multiplicity of secondary siphon tubes will substantially empty said header tube.

12. The irrigation system of claim 8 further comprising a flow control valve in said primary siphon tube for regulating the flow rate of water through said primary siphon tube.

13. The irrigation system of claim 8 further comprising a filter means within said water storage reservoir for filtering solid particles from the water in said water storage reservoir before said water enters said primary siphon tube.

14. The irrigation system of claim 8 wherein said water level control valve means comprises a float valve which shuts off the flow of water from said water inlet into said water storage reservoir when the level of water in said water storage reservoir reaches a height $Y_2$ which is lower than $Y_1$.

\* \* \* \* \*